Patented Aug. 17, 1926.

1,596,208

UNITED STATES PATENT OFFICE.

GEORGE F. MITCHELL, OF WASHINGTON, DISTRICT OF COLUMBIA.

PRODUCT DERIVED FROM SPECIES OF ILEX, AND PROCESS OF MAKING SAME.

No Drawing.   Application filed January 30, 1924.   Serial No. 689,442.

My invention relates to beverage-producing substances made of the caffeine-containing leaves of certain species of Ilex among which species, so far as I am aware today, are the specie named by Walter as *Ilex cassine*, and named by Alton as *Ilex vomitoria*, commonly known in North America as "yaupon", "cassina" or "Christmas-berry tree", and the specie known botanically in South America as *Ilex paraguayensis* and commonly known there as Paraguayan or Brazilian tea bush. My invention also relates to the processing of the prunings and leaves of such Ilex species or their equivalent species, for the production of said beverage-producing substances.

The substances forming a part of my invention and produced from the leaves of these bushes or shrubs differ somewhat in flavor and character, depending upon the use to which they are to be put, and upon the processing treatment to which the leaves have been subjected, and the processing differs somewhat, depending upon the ultimate product desired. The product may be in dry comminuted form suitable for making a hot brew in the way tea is made, or it may be in the form of a concentrated liquid such as an extract or sirup for flavoring soft drinks and the like. According to the characteristics of the dry products, they may be termed for convenience and identification, "green cassina", "cassina mate" and "black cassina."

In North America, as far as I know, the plant is a native of the Southern and Gulf States, extending approximately from the James River in Virginia, to the Rio Grande in Texas, and it grows preferably along the coast in sandy soils or along the border of small streams or swamps. The plant known in South America as *Ilex paraguayensis*, as far as I know, grows extensively in Paraguay, Brazil and Uruguay, and to a considerable extent in Argentina. It may also grow in other countries under the same or similar names, but I am not personally aware of this.

In America, the leaves of the cassina were used by the Indians at the time of the earlier settlers, for preparing a drink known by them to act as a stimulant and claimed by them to have certain curative properties. The white settlers of North America learned of this use from the Indians, and during the Civil War the leaves of this plant were used by the Confederate soldiers and families in the South for the purpose of brewing a beverage. But the beverage did not become popular due to the fact that the leaves were not properly treated to destroy or convert certain inherent constituents which rendered the drink unpalatable. In this prior use the leaves were either stripped directly from the bush by hand and boiled in a pot of water, or the leaves were parched by subjecting them just as they came from the bushes, to heat, and then brewed. This method of handling the leaves resulted in an unpalatable and unpopular drink, but the drink was used because of the known stimulating characteristic of the drink, and also by the Indians because of their belief in its stimulating as well as curative effects.

In South America these leaves, treated in some crude way, say as by parching by piling a large pile of the branches and building a large fire adjacent to them, are used in great quantities for producing a beverage. According to the treatment given the leaves in South America, the leaves are not cleanly or easily separated from the twigs or branches which enter into the final product there used, and furthermore, the undesirable mucilaginous substances inherent in the leaf, is not entirely destroyed or converted, and a considerable quantity of it remains in the final product to affect the flavor of the brew made therefrom. Furthermore, the smoke from these fires give it a smoky or undesirable flavor. Also, the cells in the leaves are not properly broken down to render the ready extraction from the leaves of the desirable caffeine and aromatic soluble ingredients. The beverage or brew made from my product is therefore more palatable than that made from the South American product as now on the market, and a much stronger beverage can be obtained from a given quantity of the product. Furthermore, according to certain features of my invention, it is possible to make the oxidized or fermentable product herein referred to as black cassina.

The difficulties which have heretofore prevented the production of highly desirable substances from these leaves, is, in my opinion, due to the character and texture of the leaves, and the habit and character of the bush or branches. The branches are relatively stiff and tough resembling the toughness and stiffness of any other holly, and the leaves cling rather tenaciously to the branches. This renders it rather difficult to easily strip the leaves from the branches. Furthermore, the leaves themselves, except for the younger, tender leaves, are of a hard, close, tough, woody texture, which greatly retards the extraction of the aromatic flavors and caffeine from the leaves unless they have been specially treated to overcome this difficulty. Due to the above-mentioned character of the leaves, they are also incapable of being properly rolled or crushed such as in the manner in which tea leaves may be rolled, without some special treatment and provision such as I have made. Furthermore, they contain a considerable percentage of a gummy or mucilaginous substance which not only has an objectionable taste, but which also prevents the leaves being handled in the manner in which tea leaves may be handled, without some special previous treatment such as I have provided. The leaves have not the relatively large percentage of moisture and small percentage of vegetable substances to be found in tea leaves, which enables the tea leaves to be withered and rolled in the manner in which tea leaves are treated. It is these characteristics of the plant and leaf which in my opinion have prevented these leaves from being heretofore handled in a manner to produce a desirable high-grade product for beverage purposes, notwithstanding the fact that the caffeine quality of the leaves has been long known, and that there has been a very extensive use of the leaves in more or less undesirable form for use in making a hot beverage.

Another feature of my invention resides in the making of flavoring extract or flavoring sirup out of these species of Ilex, useful either as a flavoring substance wherever any other flavoring extract may be used, or as a beverage sirup used for soft drinks, such for example as the general manner in which coca cola sirup is used. It has been found that such flavoring extract has a very pleasant taste and is of considerable value as a soft drink sirup as well as for other purposes. It has been found that due to certain qualities, when this sirup is diluted with charged water, such as carbonated water, it produces on top of the drink a heavy, creamy foam which adds to the appearance of the drink and apparently tends to hold in the drink the carbonic acid gas.

My invention consists in the novel products hereinafter described made from the above-mentioned species of the Ilex or other equivalent species that may exist, and in the novel processes hereinafter described for making the same, and the invention will be more particularly pointed out in the appended claims.

There are a number of features or characteristics common to the different specific products hereinafter more fully disclosed, also as to the different specific processes by which the products are made, there are a number of steps that are common to each of these processes. I will first describe each of these specific processes together with the resulting product, and then I will discuss the common features. I may first point out, however, that I do not claim to be the discoverer of the fact that these leaves contain caffeine. That has been known for a long time.

*Green cassina.*

According to my invention, the novel product termed by me as green cassina is preferably made as follows: I take the prunings from the suitable specie of Ilex, such for example as the cassina or the Paraguayan tea bush, which have been gathered by hand or machinery, and I then treat these branches or prunings containing the leaves, for the purpose of breaking down the cells of the leaves to destroy or convert the normally undesirable mucilaginous substances inherent in the leaves. This may be accomplished by subjecting these branches to a moist heated non-liquid fluid, preferably live steam. The use of the heated fluid such for example as live steam, performs further desirable functions. It causes the leaves to be detached or loosened from the branches so that they either fall off while being subjected to the steam, or may be readily threshed or otherwise separated from the branches after the steaming process. It destroys the oxidizing enzymes in the leaves which are productive of oxidation. The steam thus acts to sterilize or destroy the enzymes; and it renders the leaves more flexible and physically fitted for a rolling process, as hereinafter described. The steaming process, therefore, is a means of loosening the leaves from the stems, rendering them more pliable, destroying the enzymes and developing or retaining certain desirable flavors by breaking down, destroying or converting the said objectionable mucilaginous substances.

This steaming operation is preferably carried out in large operations, as follows: A chamber is provided into which live steam may be discharged, and the branches containing the leaves may either be loaded on cars and run into this chamber and the chamber then closed and the steam admitted for a suitable length of time, preferably about a quarter of an hour, and then the chamber is opened and the car is rolled out; or if desired, the branches may be suitably conveyed into the chamber on conveyors, which may be drawn as by an endless belt or the like into the chamber and then stopped long enough for the steaming operation and then moved on to discharge the steamed branches at the other end. Of course, if the branches are submitted to the steam under considerable pressure, the duration of time of the steaming may be reduced. After the steaming operation, such small quantities of the leaves as still cling to the branches may be easily threshed or otherwise separated from the branches, but the bulk of the leaves will be removed in the closed chamber in which they were subjected to the steam.

The steamed leaves are then collected and subjected to a treatment to break down the cells of the leaves, for the purpose of enabling a more ready extraction of the desirable ingredients. This is preferably accomplished by subjecting the leaves to pressure, and this pressure may be brought about by passing the steamed leaves through a tea-rolling machine the operation of which is well understood. This rolling operation thoroughly breaks down the cells of the leaves. If it were not for the previous steaming operation the mucilaginous ingredients of the leaves would prevent their being successfully handled in the rolling machine, and likewise the texture of the leaves, aside from the mucilaginous substances, would prevent their cells from being properly broken down in the rolling machine. The above-mentioned steaming of the leaves softens the leaves so that they may be satisfactorily handled in this rolling machine.

After this process of breaking down the cells of the leaves, they are then treated for the purpose of toasting to assist in bringing out or better developing the aromatic ingredients in the leaves, so that these ingredients may be more readily extracted, and also for the purpose of rendering the product stable for commerce. This drying is preferably carried on by subjecting the leaves to a temperature preferably of about 80° to 160° C., although the temperature may be carried up beyond 160° without hurting the product. It is considered to be dangerous, from the standpoint of operation, to carry the temperature much beyond this point, due to the probability of explosions or fire or burning the leaves. Any suitable drying machine, such as a tea-drying machine, may be utilized for this operation. The duration of the drying depends entirely upon the temperature and the draft or ventilation, but in an average case approximately 20 to 30 minutes is allowed.

These dried leaves are then comminuted, cut or ground and are ready for market. The degree of fineness of the grinding will depend entirely upon the character of the product desired for any particular market. They may be very finely ground, practically to powder form, or they may be ground into fine flakes.

This product when treated with hot water in any suitable manner, such as by steeping, percolating or boiling, yields a pleasant stimulating palatable beverage free of the objectionable mucilaginous substances and containing an appreciable percentage of caffeine.

*Cassina mate.*

According to my invention, the novel product termed by me as cassina mate is preferably made as follows: The leaf-bearing branches are subjected to the steaming process as described in connection with the making of green cassina for effecting the same results, and then the steamed leaves are treated to break down the cells in the same manner described for green cassina,—i. e., preferably by treating them in a tea-rolling machine, and then they are dried as described in the making of green cassina, except that in the case of making cassina mate, instead of drying the leaves at a temperature ranging from approximately about 80° C. to 160° C., the leaves in this case are subjected to the lower temperature of approximately 80° C., i. e., a temperature which is insufficient as a drying process to destroy certain constituents in the leaf which if allowed to remain, have the effect of altering the flavor of the product by subsequent process of storage. The crushed leaves after being dried at this relatively low temperature are comminuted and then put in closed containers for a substantial period of time, preferably about six months or longer. This has the effect of bringing about a change in the leaves which develops a flavor characteristic of the product when thus treated and stored, and as distinguished from the green cassina made by drying at a possibly higher temperature and not stored.

*Black cassina.*

According to my invention, the novel product termed by me as black cassina is preferably made as follows: I take the prunings as in the case of green cassina, and subject them to the steaming operation which renders the leaves more flexible and at the same time destroys or converts the objectionable mucilaginous substances, and then I put a certain amount of these leaves in a tea-rolling machine and add to them a suitable percentage of the comminuted green leaves, and press and roll these leaves together in the rolling machine. The reason for doing this is, that to get the black cassina, I desire to ferment the leaves substantially throughout their structure to destroy or eliminate the objectionable mucilaginous substances by fermentation, and at the same time I must break down the cells of the green leaves. I have found it extremely difficult to provide any other means of thoroughly breaking down the cells of the green leaves without destroying the oxidizing enzymes necessary for the fermentation, and therefore I discovered this means of arriving at that end,—namely, in utilizing a large percentage of the sterilized or steamed leaves and mixing with them broken or comminuted green leaves and then subjecting the mixture to pressure and rolling. I have found that in this manner both sets of leaves have their cells thoroughly crushed so that the green leaves are in this way rendered susceptible to thorough fermentation, and I have also found that the steamed leaves have become inoculated by the juices from the green leaves during this rolling or inmixing process, and that as a result of inoculation they are also rendered capable of being fermented, so that the whole mass of green and steamed leaves is capable of undergoing fermentation after this rolling process. I might also mention that by mixing the steamed and the green leaves together, the rollers of the machine are prevented from becoming gummed up as will be done if it is attempted to roll the green leaves alone. I have found it impossible to carry out the successful operation of rolling the green leaves alone because of the extraction of the mucilaginous substances which gum up the rolls and gum together the mass of leaves and prevent the proper cell-crushing action.

After the pressing or rolling process has been completed, I then spread the leaves out in a layer say from 1 to 4 inches thick, and let the leaves stand preferably in a cool moist atmosphere, for sufficient time to effect the desired degree of fermentation. Ordinarily, when subjected to the above-mentioned character of atmosphere, from 2 to 18 hours will suffice. The extent of oxidation or fermentation is important in controlling the ultimate flavor of the product, and I might therefore mention that from my experience I have found that when the leaves commence to give off an odor resembling that of a new clay pipe, it is found that the fermentation has reached the most desirable stage. At this stage the leaves are dried as in the case of green cassina, by being subjected to a temperature of from 80° C. to 160° C., in any suitable well known drying apparatus, such for example as for drying tea or fruits.

I might further point out in connection with the making of black cassina that I have discovered that the minimum amount of the green comminuted leaves which can be used with the steamed leaves to bring about a successful inoculation for subsequent fermentation, is about 5% of the green leaves to 95% of the steamed leaves, and that the maximum amount of the green leaves which I have so far found can be handled in a practical way as regards cell-crushing or rolling, is about 50% of the green leaves to 50% of the steamed leaves.

I would like to further point out that it is possible that the inoculation of the steamed leaves may be brought about by the use of the undestroyed oxidizing enzymes of the green leaves other than by directly mixing the green leaves with the steamed leaves. These enzymes may be extracted in any suitable manner from the green leaves, and the steamed leaves inoculated with this extract such as by sprinkling or the like. I might also mention that it is, in my opinion, possible that successful inoculation may be brought about by the use of enzymes other than those derived from the special species of Ilex, and therefore I do not want to be understood as limiting myself in the broader aspects of my invention to the inoculation of the steamed leaves by the enzymes of a species of Ilex.

*General remarks.*

It will be seen from the foregoing that in the making of each of these products the leaves have been subjected to a cell-breaking process such as to thoroughly break down the cells, and that in each case the objectionable mucilaginous substances inherent in the leaves have also been destroyed or rendered unobjectionable, in the case of green cassina and cassina mate by the steaming operation, and in the case of the black cassina by the fermentation operation as regards the percentage of green leaves present, and in each case the leaves have been dried and comminuted.

With regard to the making of extracts and flavoring or soft drink sirups, it will be understood from the foregoing that such extract may be made from the green cassina, casina mate, or the black cassina, depending upon the particular flavor desired. With regard to the making of these extracts, it is possible, although I have not yet tried it, that the caffeine and flavoring ingredients may be extracted from the fresh leaves without undergoing the steaming process, and that these juices as extracted or somewhat diluted, may be subjected to a heating or fermentation process which will destroy the undesirable mucilaginous substances to produce a satisfactory extract, and as regards the broader aspects of my invention, if this is novel with me, I wish to be understood as having it included as a part of my invention, although I believe that the making of the extracts from my above-mentioned products is far superior and more advantageous.

I may further point out that I have found that the branches from which the leaves have been stripped are sufficient, when cut up as in a hogging machine, to be used as fuel to create the necessary steam for the steaming operation, and the necessary hot air for the drying operation, with little if any supplemental fuel. This is a valuable feature in reducing the cost of processing the leaves.

This case is filed as a continuation, in part, of my pending application Serial Number 540,366, filed March 1, 1922, for manufacture of a beverage-producing substance from Ilex.

In the appended claims, where I use the word "loosen" as applied to the effect of the steam treatment on the leaves, I wish to be understood as using the word in the sense of loosening the leaves so that they may be readily shaken off from the branches, or of loosening them to the extent such that they will become entirely detached from the branches. Furthermore, where in the claims I use the expression "rendering unobjectionable certain objectionable mucilaginous substances", I wish to be understood as using the expression in the sense of defining either the rendering of the substances unobjectionable by a modification of the natural state of the same, or the total destruction of such objectionable substances.

Having thus described my invention, what I claim as new and desire to secure by Letters Patent, is:

1. Process of treating caffeine containing leaves of a suitable specie of Ilex for the production of a beverage-producing or flavoring substance, which comprises subjecting the leaf-bearing branches to steam for a sufficient period to loosen the leaves, breaking down the cells of the leaves and drying the leaves.

2. Process of treating caffeine containing leaves of a suitable specie of Ilex for the production of a beverage-producing or flavoring substance, which comprises subjecting the leaf-bearing branches to steam for a sufficient period to render unobjectionable certain mucilaginous substances inherent in the leaves, breaking down the cells of the leaves and drying the leaves.

3. Process of treating caffeine containing leaves of a suitable specie of Ilex for the production of a beverage-producing or flavoring substance, which comprises subjecting the leaf-bearing branches to steam for a sufficient period to render the leaves sufficiently flexible for further treatment without breaking the leaves, breaking down the cells of the leaves and drying the leaves.

4. Process of treating caffein-containing leaves of a suitable specie of Ilex, which comprises treating the leaves so as to render unobjectionable certain objectionable mucilaginous substances inherent in the leaves and manipulating the leaves so as to break down their cells, and drying the leaves.

5. Process of treating caffein-containing leaves of a suitable specie of Ilex for the production of a beverage-producing or flavoring substance, which comprises softening and manipulating the leaves so as to break down their cells, and treating the leaves so as to cause fermentation thereof.

6. Process of treating caffeine-containing leaves of a suitable specie of Ilex for the production of a beverage-producing or flavoring substance, which comprises rendering unobjectionable certain mucilaginous substances inherent in the leaves, as by steaming and fermentation, and breaking down the cells of the leaves as by pressure, and drying the leaves.

7. Process of treating caffeine-containing leaves of a suitable specie of Ilex for the production of a beverage-producing or flavoring substance, which comprises rendering unobjectionable certain mucilaginous substances inherent in the leaves, as by steaming and breaking down the cells of the leaves as by pressure, and drying the leaves at a temperature of from about 80° to 160° C., and comminuting the leaves.

8. Process of treating caffeine-containing leaves of a suitable specie of Ilex for the production of a beverage-producing or flavoring substance, which comprises subjecting the leaf-bearing branches to a steaming operation sufficient to loosen the leaves from the branches, render unobjectionable certain mucilaginous substances inherent in the leaves, and render the leaves more flexible, then breaking down the leaf cells as by subjecting the leaves to pressure, and drying the leaves.

9. Process of treating caffeine containing leaves of a suitable specie of Ilex for the production of a beverage-producing or flavoring substance, which comprises subjecting the leaf-bearing branches to live steam while in a chamber for a sufficient time to loosen the leaves and render them more flexible and to render unobjectionable certain objectionable mucilaginous substances inherent in the leaves, then breaking down the leaf cells as by rolling and pressure, and then drying and comminuting the leaves.

10. Process of treating caffeine-containing leaves of a suitable specie of Ilex for the production of a beverage-producing or flavoring substance, which comprises rendering unobjectionable certain objectionable mucilaginous substances inherent in the leaves, and breaking down the cells of the leaves and drying and grinding the leaves.

11. The steps in the process of treating caffeine-containing leaves of a suitable specie of Ilex for the production of a beverage-producing or flavoring substance, which comprise rendering unobjectionable certain objectionable mucilaginous substances inherent in the leaves, breaking down the cells of the leaves, and inoculating said leaves with the juices of leaves in which the enzymes have not been killed by previous treatment.

12. The steps in the process of treating caffeine-containing leaves of a suitable specie of Ilex for the production of a beverage-producing or flavoring substance, which comprise steaming the leaf-bearing branches sufficient to loosen the leaves then render the same more flexible for subsequent treatment, then breaking down the cells of the leaves and inoculating the same with enzymes from the juices of suitable leaves which have not been treated to destroy these enzymes, and then fermenting the leaves and drying them.

13. The process of treating caffeine-containing leaves of a suitable specie of Ilex for the production of a beverage-producing or flavoring substance, which comprises steaming the leaf-bearing branches sufficient to loosen the leaves and render the same more flexible for subsequent treatment, then breaking down the cells of the leaves and inoculating the same with enzymes from the juices of suitable leaves which have not been treated to destroy these enzymes, fermenting the leaves by subjecting them to a moist atmosphere for a sufficient length of time to develop an odor somewhat similar to that of a new clay pipe, and then drying the leaves.

14. The process of treating caffeine-containing leaves of a suitable specie of Ilex for the production of a beverage-producing or flavoring substance, which comprises treating the leaves to render unobjectionable certain objectionable mucilaginous substances inherent in the leaves, which treatment incidentally destroys the oxidizing enzymes, and then breaking down the cells of the leaves and inoculating them with suitable oxidizing enzymes to render the leaves capable of subsequent fermentation, and then fermenting the leaves and drying them.

15. The process of treating caffeine-containing leaves of a suitable specie of Ilex for the production of a beverage-producing or flavoring substance, which comprises rendering unobjectionable certain objectionable mucilaginous substances inherent in the leaves, adding to said treated leaves a suitable amount of comminuted fresh leaves containing oxidizing enzymes and subjecting said treated and fresh leaves to a mixing and pressure operation to break down the cells of the leaves and inoculate the previously treated leaves with the enzymes of the fresh leaves, then fermenting the mixed leaves and drying them.

16. The process of treating caffeine-containing leaves of a suitable specie of Ilex for the production of a beverage-producing or flavoring substance, which comprises rendering unobjectionable certain objectionable mucilaginous substances inherent in the leaves, adding to said treated leaves from about 5% to 50% by weight of comminuted fresh leaves containing oxidizing enzymes and subjecting said treated and fresh leaves to a mixing and pressure operation to break down the cells of the leaves and inoculate the previously treated leaves with the enzymes of the fresh leaves, then fermenting the mixed leaves and drying and grinding the leaves.

17. Process of treating caffeine-containing leaves of a suitable specie of Ilex for the production of a beverage-producing or flavoring substance, which comprises breaking down substantially all of the cells of the leaves and substantially freeing said leaves of the objectionable flavors of the objectionable mucilaginous substances inherent in the leaves by producing fermentation of the leaves, and then drying the leaves.

18. As a product of manufacture, a fermented substance derived from caffein-containing leaves of a suitable specie of Ilex, containing caffein and desirable flavoring ingredients of said leaves and substantially free of objectionable flavors of certain objectionable mucilaginous substances inherent in said leaves.

19. As a product of manufacture, a dry ground substance from which a palatable beverage may be produced by treating with hot water, and made of leaves of a suitable specie of Ilex and substantially free of objectionable flavors of certain objectionable mucilaginous substances inherent in such leaves.

20. As a product of manufacture, a dry ground substance made of fermented caffein-containing leaves of a suitable specie of Ilex and containing caffein and substantially free of objectionable flavors of certain objectionable mucilaginous substances inherent in such leaves.

21. As a product of manufacture, a substance derived from caffeine-containing leaves of a suitable specie of Ilex and containing caffeine and desirable flavoring ingredients of said leaves and substantially free of objectionable flavors of certain objectionable mucilaginous substances inherent in the said leaves.

GEORGE F. MITCHELL.